US010659630B2

(12) United States Patent
Logan (10) Patent No.: US 10,659,630 B2
(45) Date of Patent: May 19, 2020

(54) CORRECTIONAL INSTITUTION LEGAL POSTAL MAIL PROCESSING SYSTEM AND METHOD

(71) Applicant: HLFIP Holding, Inc., Placida, FL (US)

(72) Inventor: Jonathan D Logan, Tampa, FL (US)

(73) Assignee: HLFIP Holding, Inc., Largo, FL (US)

( * ) Notice: Subject to any disclaimer, the term of this patent is extended or adjusted under 35 U.S.C. 154(b) by 0 days.

(21) Appl. No.: 16/286,305

(22) Filed: Feb. 26, 2019

(65) Prior Publication Data
US 2019/0268488 A1 Aug. 29, 2019

Related U.S. Application Data

(60) Provisional application No. 62/634,975, filed on Feb. 26, 2018.

(51) Int. Cl.
| | |
|---|---|
| *H04N 1/00* | (2006.01) |
| *G06Q 50/26* | (2012.01) |
| *G06Q 50/32* | (2012.01) |
| *G06K 9/00* | (2006.01) |
| *H04N 1/44* | (2006.01) |

(52) U.S. Cl.
CPC ..... *H04N 1/00336* (2013.01); *G06K 9/00006* (2013.01); *G06K 9/00221* (2013.01); *G06K 9/00469* (2013.01); *G06Q 50/26* (2013.01); *G06Q 50/32* (2013.01); *H04N 1/4473* (2013.01)

(58) Field of Classification Search
CPC ............. H04N 1/00336; H04N 1/4473; H04N 1/00221; G06K 9/00469; G06K 9/00006; G06K 9/00221; G06Q 50/32; G06Q 50/26
See application file for complete search history.

(56) References Cited

U.S. PATENT DOCUMENTS

| | | |
|---|---|---|
| 5,917,925 A | 6/1999 | Moore |
| 7,502,451 B2 | 3/2009 | Gyllenskog |
| 7,804,941 B2 | 9/2010 | Keiser |
| 8,204,177 B2 | 6/2012 | Harper |
| 9,311,627 B1 | 4/2016 | Shipman, Jr. |
| 9,742,935 B1* | 8/2017 | Shipman, Jr. ...... H04N 1/00241 |

(Continued)

OTHER PUBLICATIONS

Finland postal service to open mail and send scanned email copies, Telegraph Media Group Limited 2019, https://www.telegraph.co.uk/news/worldnews/europe/finland/7545709/Finland-postal-service-to-open-mail-and-send-scanned mail-copies.html, UK.

(Continued)

*Primary Examiner* — Kent Yip
(74) *Attorney, Agent, or Firm* — Shah IP Law, PLLC; Samar Shah (57) ABSTRACT

A method and system for eliminating contraband in legal postal mail at a correctional facility comprising of a facility-use legal mail scanning station and a network of inmate-accessible devices and or messaging systems such that correctional institution staff can inspect the legal mail for contraband without violating an inmate's right to privacy for such mail. The legal mail is scanned by the staff member or inmate under the supervision of a staff member and then shredded or placed into the inmate's personal property in secure storage. The scanned mail may then be made available to the intended inmate through the inmate-accessible devices or printed at the scanning station to ensure the elimination of contraband.

26 Claims, 6 Drawing Sheets

(56) References Cited

U.S. PATENT DOCUMENTS

| | | |
|---|---|---|
| 2009/0052804 A1 | 2/2009 | Lewis |
| 2013/0179949 A1 | 7/2013 | Shapiro |
| 2014/0006148 A1 | 1/2014 | Perna |
| 2015/0215254 A1 | 7/2015 | Bennett |
| 2016/0337360 A1 | 11/2016 | Logan |

OTHER PUBLICATIONS https://www.smartjailmail.com/,SmartJailMail.com.

* cited by examiner

CORRECTIONAL INSTITUTION LEGAL POSTAL MAIL PROCESSING SYSTEM AND METHOD

This application includes material which is subject to copyright protection. The copyright owner has no objection to reproduction by anyone of the patent disclosure in its entirety, as it appears in the Patent and Trademark Office files or records. but otherwise reserves all copyright rights whatsoever.

This application claims priority from U.S. provisional patent application Ser. No. 62/634,975, filed Feb. 26, 2018, entitled Correctional Institution Legal Postal Mail Processing System and Method, each of which is hereby incorporated by reference herein for all purposes.

FIELD OF THE INVENTION

The presently disclosed invention relates in general to the field of postal mail delivery, and in particular, to a system and method for providing copies of postal mail to individuals incarcerated in a correctional facility in a safe manner in order to ensure the elimination of any contraband, reduce administrative costs for the correctional facility, while still allowing for delivery of legal postal mail which is privileged and is intended to be viewable by the inmate only, and not by the correctional facility staff or investigators.

BACKGROUND

Methods for the delivery of postal mail and electronic mail to inmates are known in the art. Procedures or methods for dispensing mail via traditional postal systems have been described in U.S. Pat. No. 5,917,925. Systems for using electronic messaging in institutions, such as prisons, have been described in U.S. Pat. No. 7,502,451. A system and method for electronically delivering postal mail to inmates is described in U.S. application Ser. No. 15/153,171. The foregoing patents and applications are hereby incorporated herein by reference, in their entireties. It is well known that legal postal mail is privileged and not searched by the facility staff prior to delivery to the inmate which provides an opportunity for contraband to be transferred by way of legal postal documents to inmates. This presents a problem for the correctional facility which needs to be resolved so inmates can receive legitimate privileged legal postal mail without the possibility of receiving contraband material. However, the system and method disclosed in U.S. application Ser. No. 15/153,171 and the associated procedures or methods do not adequately address the conversion of postal mail which is been sent to the inmate under the privileged legal postal mail category to electronic mail for the elimination of any contraband being delivered to prison inmates, and U.S. application Ser. No. 15/153,17, the disclosure of which is incorporated by reference in its entirety, does not address the processing of privileged legal postal mail that is not to be viewable by anyone other than the inmate, such as communications that are marked and appear by their envelope to be from the inmate's attorney. Embodiments of the presently disclosed invention address such limitations, inter alia, by providing an improved system and method for delivery of mail identified as legal postal mail to inmates in a correctional facility that allows for delivery of legal postal mail that can be viewed only by the inmate. The instant invention provides the correctional facility with greatly reduced likelihood that such legal postal mail could also be used for transferring or transmission of contraband to the inmate.

SUMMARY OF THE DISCLOSURE

The present inventions provides an apparatus, system and method for eliminating contraband in privileged legal postal mail delivered to a correctional facility. The processing facility for receiving the mail can either be at a central facility or located at the local correctional facility. Staff at a processing facility may receive postal mail for inmates which are located at many different facilities or are located at the same location as the processing facility. Upon receipt at the processing facility, the postal mail may be reviewed for information. Such information may be addressee or recipient inmate information, sender information, institution information, or any other information discoverable upon inspection, review or analysis of the postal mail without opening it. The staff determines that the mail contains privileged legal postal mail by using the results of the inspection, review or analysis of the postal mail and comparing it to a predetermined protocol which assist the staff to correctly categorized the mail as legal postal mail. The protocol may compare the sender with a known list, originator information, originating post office, court information, attorney name, law firm designator or other information to the information on the exterior of the Postal mail.

If the postal mail meets the preset criteria for being privileged legal postal mail it can then be separated from the other non-legal postal mail. Once information is retrieved from the mail, the information may be associated with the intended recipient inmate, such as through an inmate identifier or email. The non-legal postal mail may then be processed by the appropriate method or protocol used by the processing facility which may include scanning it to create an electronic copy which may be stored, such as on a server which may be accessed over a network. The electronic copy of the non-legal postal may include any and all information obtained from the postal mail including its contents, and additional information such as whether contraband was found in the postal mail.

The privileged legal postal mail may optionally be logged as having been received, and then forwarded for delivery to the inmate without opening. The log can either be electronic or manual. If the processing facility is outside the correctional facility, then the legal postal mail may be received at the processing facility and forwarded to the correctional facility. If the processing facility is in the correctional facility, then the legal postal may be logged there, without opening, and then forwarded on to personnel at the correctional facility associated with the inmate for delivery to the inmate.

Regardless if the processing facility is remote or located at the correctional facility when the privileged legal postal mail arrives at the correctional facility associated with the inmate it may then be delivered to the inmate using a legal postal mail scanning station which is configured to process the legal postal mail to provide an appropriate inspection without violating the inmate's rights to privacy. The legal postal mail delivery station can be configured to have equipment and software which will provide for opening, scanning and delivering the scanned image copies in either printed copies or electronic copies depending on the desire of the inmate and the protocols of the correctional institution. The legal postal mail delivery station could contain any combination of the following hardware and associated software, a copier, a shredder, a scanner, a scanner shredder, a copier shredder, a tablet or other computer with memory, viewing software, printing software, portable storage medium docking device such as, but not limited to a USB connector, CD burner and reader, a printer and a camera. The legal postal mail may then be delivered to the inmate who, in front of correctional facility staff, will open the legal postal mail and copy it with the copier, or scan it with the scanner, after which it is shredded or placed into a secure inmate property bag. In the case of scanning, a scanned image will either be printed, loaded onto a portable storage medium or transmitted to a server for later viewing via an inmate messaging system. The legal postal mail scanning station may be in a fixed location or may be on a mobile cart.

BRIEF DESCRIPTION OF THE DRAWINGS

The foregoing and other objects, features, and advantages of the invention will be apparent from the following more particular description of embodiments as illustrated in the accompanying drawings, in which reference characters may refer to the same parts throughout the various views. The drawings are not necessarily to scale, emphasis instead being placed upon illustrating principles of the invention.

DETAILED DESCRIPTION OF THE EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A scanned image copy or scanned image or scan image are used interchangeably and is defined as a scan image of the legal postal mail and any associated materials including envelope, photographs, pictures, etc.

The term processing facility, central facility, mail processing facility are used interchangeably and refer to a facility for receiving the mail and can either be at a central facility or located at the local correctional facility.

An inmate messaging system and email system are used interchangeably and mean a messaging system that is accessible by the inmate.

Correctional facility staff, correctional personnel, correctional institution staff member, institution staff and institution personnel are used interchangeably and refer to individuals who work at the correctional institution.

Legal mail and legal postal mail are used interchangeably and refer to mail that cannot be viewed or processed by the correctional facility staff prior to delivery.

Portable computer, computer and tablet are used interchangeably and refer to a computer attached to legal mail processing cart.

Wireless mobile telecommunications technology and wireless network are used interchangeably and refer to wireless internet communication systems which are commonly referred to as 1G, 2G, 3G, 3.5G, 4G 4.5G and 5G networks Correctional facility, correctional institution, institution and facility are used interchangeably and refer to refer to a facility for housing inmates.

Legal postal mail and legal mail and postal mail are used interchangeably and refer to postal mail containing legal communications for an inmate.

Reference will now be made in detail to the embodiments of the presently disclosed invention, features of which are illustrated in the accompanying drawings.

Postal mail is a federal right to U.S. citizens incarcerated in a correctional facility within the United States. Postal mail, however, has been used to deliver inappropriate and illegal contraband, including photographs, pornography and illegal drugs, to inmates. While most postal mail can be searched for contraband before delivery to inmates, certain mail is considered privileged such as legal postal mail cannot be viewed or processed by the correctional facility staff prior to delivery. Herein the term "legal postal mail" refers to mail that correctional facility staff is not permitted to view by law, regulation or facility policy, and includes, without limitation, letters that appear to have been sent by inmate's legal postal counsel. Whether or not postal mail is to be treated as legal postal mail is determined by viewing information visible on the outside of the postal mail without opening it. The specific protocol used by the processing facility may include comparing the sender with a known list, originator information, originating post office, court information, attorney name, law firm designator or other information to the information on the exterior of the Postal mail.

While most legal postal mail is likely to be contraband-free, particularly when it is legitimate communications from legal postal counsel, it is possible that some postal mail may be disguised as legal postal mail in order to avoid pre-delivery inspection, or, in rare cases, that unscrupulous persons may include contraband in otherwise legitimate legal postal mail (e.g. a personal note from a family member that has been treated in a way that can be used to deliver illegal postal substances into the facility). There is, therefore, a need to allow legal postal mail to be delivered to inmates in a way that complies with the inmate's rights, but also eliminates or greatly reduces the likelihood of legal postal mail being a conduit for contraband.

The present disclosure describes embodiments of systems and methods that meet this need in which legal postal mail is delivered to the inmate at a legal postal mail processing station. The legal postal mail processing station can be either a fixed or mobile processing station. When a fixed station is installed then the inmate must be taken to the location of the processing station. If the processing station is a mobile design, then the processing station is relocated to the inmate. In either case the institution personnel log into the legal mail processing cart computer to initiate the process, then the legal postal mail is opened by the inmate in front of correctional facility staff and inserted into a scanner or copier which is part of the processing station. If the processing station has a copier and that copier is used to replicate the legal postal mail then the inmate is given the copies of the copied document and the inmate confirms that all the pages are readable and useable prior to the corrections officer or inmate placing the legal postal mail into the shedder for disposal of the original legal postal mail or into a secure inmate property bag for storage which eliminates the possibility of any contraband being transferred to the inmate. If the legal postal mail is scanned at the legal postal mail processing station then the scanned legal postal mail is then either printed or reviewed on a computer (herein the term "computer" refers to any device capable of displaying the scanned image or delivering such image to an inmate messaging system including, but not limited to a tablet computer, desktop computer or laptop, the computer being configured with memory and electronic communication means—such as , but not limited to, Bluetooth®, Zigbee®, WI/FI, 3G, 4 G and 5 G wireless mobile telecommunications technology, radio frequency, telephonic modem signals and wired ethernet). Once the inmate determines that the scan is accurate, the original legal postal mail is deposited into a shredder or into a secure inmate property bag for storage, which eliminates the possibility of any contraband being transferred to the inmate. In the event a printed copy was made, the printed copy will be contraband-free and may be left with the inmate. In the event an electronic scan was made, it may be delivered to an inmate messaging system and flagged as a privileged message such that the messaging system will allow it to be viewed only by the inmate and not by correctional facility staff. A third option that is anticipated by the instant invention is where the legal postal mail processing station is located at a central processing facility and the inmate joins the opening process via video conferencing. When this process is used then the inmate controls the opening and scanning of the mail and confirms that the mail has been scanned accurately via the video conferencing method before the correctional facility staff is released by the inmate to shred the legal postal mail or place the legal postal mail into their property storage. In certain embodiments non-legal postal mail processed at a central facility is also scanned and viewed by the inmate through the same messaging system, as is described in the incorporated references. In certain embodiments the opening and scanning process is recorded with a camera and the video is stored on the legal postal mail scanning station or uploaded to a server where the record of the opening and scanning may be retrieved and reviewed at a later time.

An alternated embodiment provides for a unique identifier for each piece of legal postal mail. The identifier is placed on the legal postal mail once it is identified by the staff as legal postal mail. This provides a unique identifier for the legal postal mail and insures that there is proper handling of the mail. The unique identifier could be in any form that allows electronic tracking so that the mail is easily identifiable as legal postal mail. The following is a brief description of the process utilizing the unique identifier to track legal postal mail within the facility and insure that the mail is delivered expeditiously to the correct inmate. The process could utilize the following steps:

1) When legal postal mail has been identified at the mail receiving station as legal postal mail it is assigned a unique identifier id which has a corresponding RFID and/or bar code. Alternatively, the institution could also use a Bluetooth® LTE, WI/FI or ZigBee® transmitter as the unique identifier and the address or id for that transmitter would be associated with the particular piece of mail.
2) The unique identifier id is then associated with the legal postal mail 1 and the inmate identifier which is associated with the inmate who the legal postal mail is addressed to by entering it in a legal postal computer tracking system which must be accessible from the legal postal mail processing cart.
3) The legal postal mail and the legal postal mail processing cart will be taken to the inmate or if the legal postal mail processing cart is stationary the inmate will be brought to the legal postal mail processing cart.
4) The staff member logging in to the mail scanning station using credentials to identify the staff member.
5) The staff member searching for the recipient inmate by name or ID number to associate the upcoming scan with the inmate's account;
6) The institution personnel will scan the legal postal mail unique identifier and the inmate identifier and enter them into the legal postal mail computer tracking system. The inmate identifier could be, but not limited to, facial recognition, RFID identity card, RFID bracelet, Bluetooth® LTE, WI/FI or ZigBee® transmitter.
7) If the legal postal mail unique identifier and inmate identifier do not match, the mail will be returned to the mail receiving station for verification. If the unique identifier and the inmate identifier match, then the legal postal mail will be opened by the inmate in front of the institution personnel.
8) The legal postal mail will be scanned in front of the inmate by the institution personnel or by the inmate under the supervision of the institution personnel.
9) The inmate will compare the scanned legal postal mail and the legal postal mail.
10) After the inmate concurs with the scan legal postal mail of the legal postal mail the Bluetooth® LTE, WI/FI or ZigBee® transmitter, RFID and/or barcode, or other technology equivalent, may or may not be removed by the institution staff and the mail will be bagged for storage or shredded.

11) The inmate will be provided access to the scan mail either through using their inmate identifier and the messaging system of given a printed copy of scan mailed.

Figure 1:
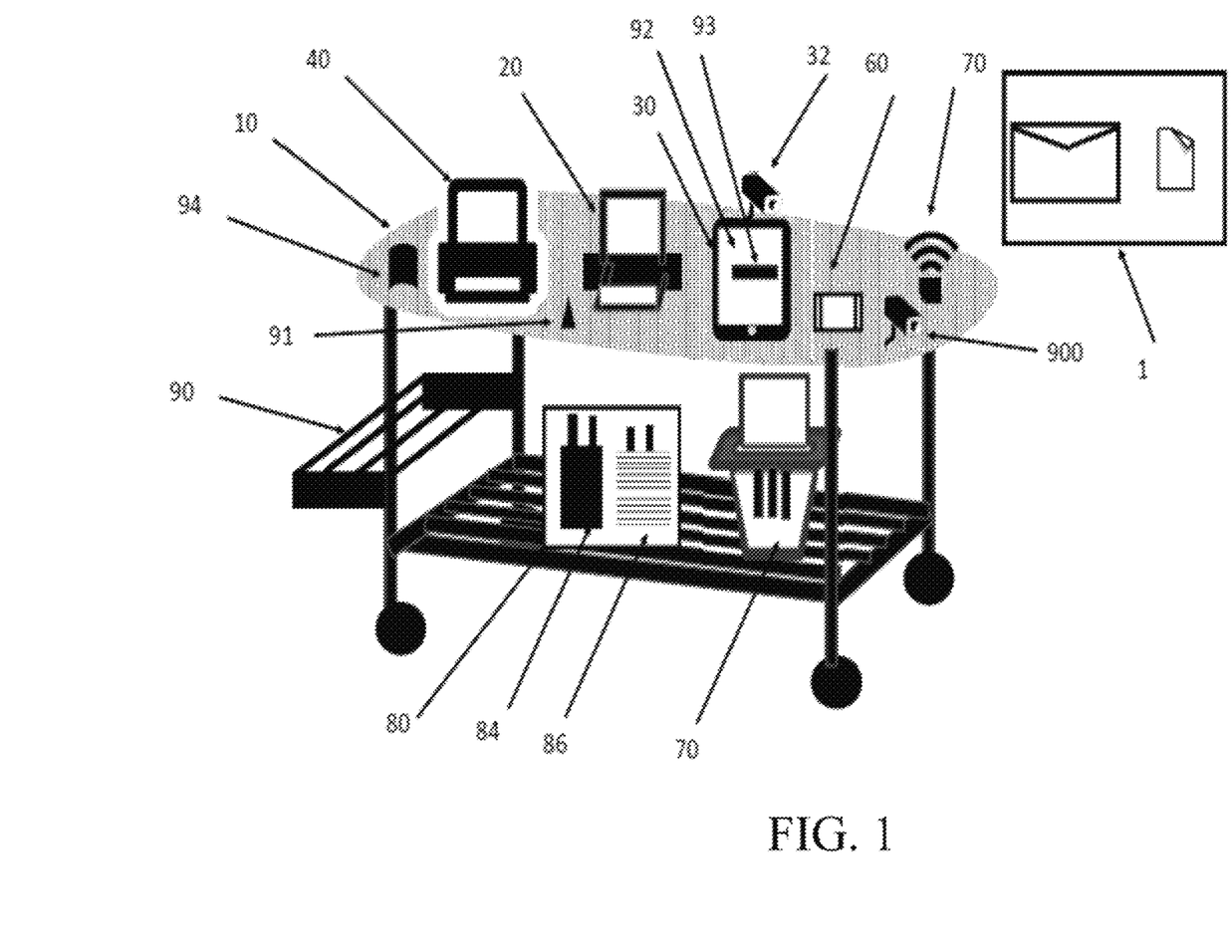
FIG. 1 illustrates a schematic drawing of a cart providing a legal postal mail delivery station for the processing of legal postal mail in a correctional facility.

FIG. 1 illustrates, in schematic form, an embodiment of a mobile legal postal mail processing station in the form of legal postal mail processing cart 10 suitable for use in a correctional facility. Legal postal mail processing cart 10 is wheeled so that it may be moved by correctional facility staff so that it can be taken to the inmate's location, thereby avoiding the risks and complications of moving the inmate to a fixed legal postal mail processing station. Where moving the inmate is a viable option for the corrections facility, however, the same basic configuration may be used in a kiosk or processing station that is not on a mobile cart to create a fixed-location legal postal mail processing station.

Legal postal mail processing cart 10 comprises scanner 20. Scanner 20 may be a document scanner such as the Epson WorkForce DS-510 Color Document Scanner. While any document scanner, may be used, in certain embodiments it is convenient for the scanner to be color (thereby allowing the scanning of communications that are not black and white) and to include a document feeder (either one-sided or two-sided) to enable automated scanning of multi-page communications. Optionally, it may also be, or include, a single-page flatbed scanner, which may be used for materials of a size that cannot be read by a document feeder. Wireless communication capability may also be desirable to allow scanner 20 to communicate with portable computer or tablet 30 (described below) without the need for cables.

Printer 40 may be any printer capable of printing the image captured by scanner 20. One possible printer that may be used is the HP LaserJet Pro M452nw Wireless Color Printer, but it will be understood that many other printers may be used. Where mobility is needed, both scanner 20 and printer 40 may be selected based on size and power usage needs. The less power required will result in a more robust system capable of processing more documents prior to recharging of power supply 80 (described further below), and the smaller the size will result in a more mobile Legal postal mail processing cart 10.

It will be understood that embodiments that do not require separate scanner 20 and printer 40 are also possible. For example, and without limitation, scanning and printing could be combined in a single multi-function device such as, without limitation, a Brother MFC9325CW Wireless Color Printer with Scanner, Copier & Fax, or simply a copier (not illustrated). One possible advantage of separating the scanner 20 and printer 40 into separate devices is that they can be separately controlled by a portable computer or tablet 30 such that the scanned image copy can be processed by portable computer or tablet 30 prior to, or in lieu of, printing. While it is possible that portable computer or tablet 30 may also separately control the scanning and printing of a single multi-function device, configuring it to control separate devices may reduce the likelihood that settings will be inadvertently changed on the multifunction device which will result in a more seamless implementation. This is possible because multifunction devices often include user interfaces that allow the user to reset the device configuration, whereas single purpose devices may not have such interfaces, or may have simpler interfaces with fewer settings available for configuration on the device itself. It should be noted, however that where no record of the scanned image copy is to be uploaded to an inmate messaging system, a simple copier or a multifunction device set to a copy mode may be sufficient.

Portable computer or tablet 30 may be any computer such as a laptop computer or tablet computer or a smart phone or similar device. While a desktop computer or terminal may be used, due to power requirements, a tablet or laptop computer with an internal battery may be more convenient. One such tablet computer that may serve as portable computer 30 is the Samsung Galaxy Tab S 10.5-Inch Tablet (16 GB, Titanium Bronze). But it is understood that other tablets and portable computing devices may also be used. Portable computer 30 will preferably connect to scanner 20 and printer 40 wirelessly but may also optionally connect via USB or similar cables.

In one embodiment portable computer 30 is specially programmed to serve at least two functions: authentication/logging and review. The authentication/logging function enables the correctional facility to identify and log that a particular piece of legal postal mail 1 that is being delivered to an inmate. This may be done is a variety of ways including, without limitation, by the corrections officer entering the inmates name or identifier and receiving a list of pre-logged legal postal mail 1 to be delivered, locating the appropriate postal mail, and indicating that it has been provided to the inmate. Alternatively, the corrections personnel may simply enter the inmate name/identifying number and indicate that legal postal mail 1 was delivered without having had it pre-logged or selected from a list. As a still further alternative, the inmate may use optional finger print 60 or RFID card/wristband reader 61 that is operative connected with computer to identify himself or herself, after which tablet/portable computer 30 either displays a list of pre-logged legal postal mail 1 to be delivered or allows the correctional facility staff to indicate that legal postal mail 1 is being delivered. Similarly, an optional camera 32 on tablet/portable computer 30 could be used to identify the inmate via facial recognition, retinal scan or any other unique identifying characteristic, in the same manner as optional finger print or RFID card/wristband reader 61. Theoretically one could use a DNA match to insure the inmate's identity. Where portable computer or tablet 30 does not include optional camera 32, a separate camera 900 may be used. That separate camera 900 may be any camera capable of communicating with portable computer or tablet 30, such as, without limitation, a Logitech HD Laptop Webcam C615 with Fold-and-Go Design, 360-Degree Swivel, 1080p Camera.

The particular item of legal postal mail 1 being delivered may or may not need to be specifically identified for logging purposes. If it does, then each item of legal postal mail 1 could be assigned a unique identifier during pre-processing (which may or may not take the form of a barcode sticker capable of being read by portable computer or tablet 30 or a number printed or written on the outside of the postal mail, an RFID label, a Bluetooth® LTE, WI/FI or ZigBee transmitter, or any technology equivalent. Alternatively, or in addition, the legal postal mail 1 may be photographed by portable computer 30 of the mail and/or the inmate at the time of delivery to provide a record of what was delivered and what time it was delivered. The software on the computer or tablet 30 would be enabled to take the required pictures and store them in the delivery record with the time and date stamp. The authentication/logging function may be completed by either storing the information in portable computer 30 for later printing or transfer to another database or system, or by wirelessly transmitting such information to a database or system such as an inmate messaging system, where it can be combined with other information previously gathered when the postal mail was initially processed.

For the review function, portable computer 30 may be specially programmed to trigger scanner 20 and receive an image from scanner 20. Alternatively, scanner 20 may be triggered independently and portable computer or tablet 30 may receive the scanned image copy. The inmate will then review the scanned image copy and determine if the image is clear and complete, or if it needs to be re-scanned. Once the inmate has confirmed the image, he or she may optionally acknowledge the scan via a signature (e.g. with their finger on a touch screen of portable computer 30), through facial recognition, or via optional finger print or RFID card/wristband reader 61 in the event the inmate refuses to acknowledge, the corrections personnel may note that refusal on portable computer 30 at the time and initiate an override protocol to close the transaction.

For certain correctional facilities it may be preferred that the correctional facility staff have as little physical contact with the legal postal mail 1 as possible, including for safety reasons or compliance reasons. In such environments, logging and review functions in one embodiment may be accomplished as follows:

a) an inmate would be asked to login to an inmate messaging system using portable computer 30, just as the inmate would otherwise login to receive messages. If the messaging system required a fingerprint or an RFID card/wristband to log in, then finger print or RFID card/wristband scanner 60 would be used, or a scanner integrated into portable computer 30 would be used. If login was by facial recognition, then camera 32 or a separate camera 900 could be used. Otherwise a password, PIN or pattern could be entered on portable computer 30, in the same manner in which the inmate would otherwise login to the messaging system.

b) The inmate would then open and scan or copy the legal postal mail 1, for example with scanner 20, as is otherwise described herein. Verification of the scan (via portable computer or tablet 30) or review of the printout would confirm that legal postal mail 1 had been properly scanned. Since the scanning was done while the inmate was logged in, the scan would be associated with the inmate's account. The messaging system would record that it was legal postal mail 1 based on the user interface presented to the inmate for this process. The fact that inmates otherwise do not typically upload scanned mail to the messaging system is handled by the software on computer or tablet 30 so that it is noted and recorded that it is a legal postal mail transaction.

c) The inmate would then shred the legal postal mail 1 via shredder 70 or place the legal postal mail into a secure property storage bag and log out of the messaging system using portable computer or tablet 30.

Through this process, the messaging system records that legal postal mail 1 was delivered to that inmate at that time. The fact that the inmate was able to login to the messaging system identifies that the legal postal mail 1 was delivered to the correct inmate. The logging process is thereby accomplished with a minimal amount of work by correctional facility staff, and with a minimum of handling of the legal postal mail 1. If the specific legal postal mail 1 delivered needs to be identified, the envelope or packaging of the legal postal mail 1 could be scanned or uploaded via a photograph taken by portable computer 30. In such embodiments the messaging system may provide a simple, specialized user interface specific to the processing of legal postal mail 1 in the manner described.

It will be understood that portable computer 30 may be separated from legal postal mail processing cart 10 and handed to the inmate or may be secured to legal postal mail processing cart 10 in a position in which the inmate can view it easily, but corrections personnel cannot. Where it is to be handed to the inmate, it may be disconnected (in which case it will communicate wirelessly with other devices on legal postal mail processing cart 10) or may be connected to such devices with cables. Portable computer 30 may also, for security reasons, be attached to legal postal mail processing cart 10 by a cable. In addition, it will be understood that optional finger print reader 60 may be any compatible finger print scanner or RFID card/wristband reader, including without limitation a finger print or RFID card/wristband scanner integrated into portable computer 30.

Optionally, the legal postal mail processing cart 10 camera 32 or a separate camera 900 could be used record the complete transaction using computer or tablet 30 which would consist of opening legal postal mail 1, scanning legal postal mail 1 contents and envelope, the verification of the scan image copy by the inmate and the shredding of legal postal mail 1 by the inmate as a record of the mail being delivered and processed so the inmate can have access to the information contained in the legal postal mail 1 communique. This feature could be used in addition to the authentication/logging function or as a secondary confirmation step that the mail was appropriately delivered and copied per the correctional facilities protocol. The video would be stored in the appropriate correctional facilities database.

As has been noted, in certain embodiments, the legal postal mail 1 may be printed on printer 40 and left with the inmate. In such embodiments, portable computer or tablet 30 need only provide the authentication/logging function previously described or, if no authentication/logging function is required, portable computer or tablet 30 need not be included or used at all, as in the case of a copier-based system as opposed to a scanner-based system.

Where a scanned image copy of the legal postal mail 1 is stored for later access by the inmate on an inmate messaging system such as is described in U.S. application Ser. No. 15/153,171, (the content in its entirety is incorporated herein by reference), portable computer or tablet 30 may connect with a wireless network to transfer the data in real time, or may store the data for later transfer via a network (wireless or wired ethernet), or via USB or similar hardware storage media. Where transmission via wireless network is used, portable computer or tablet 30 may include an internet wireless networking capability or may connect via an optional Wi/Fi access point 70 (which may suitably be aa NETGEAR R6080-100NAS—AC1000 Dual Band Wi-Fi Router or similar device). Alternatively, it may connect through a cellular hotspot device such as a Verizon MiFi Jetpack 4620L Verizon Wireless Wi-Fi 4G LTE Hotspot Modem or similar device. Such devices can be convenient where signal strength is not sufficient for portable computer or tablet 30 internal Wi/Fi capability to communicate with the correctional facilities network, where portable computer or tablet 30 is not Wi/Fi capable, or where special security or network requirements necessitate the use of a separate wireless access point or router.

Once the legal postal mail 1 has been printed and/or scanned and stored, the inmate will dispose of the original copy of the legal postal mail 1 by shredding it using shredder 70. The Royal Sovereign AFX-975 Auto Feed Shredder, or any other appropriate shredder may be used. For security purposes, a confetti shredder is preferred to a strip shredder. In certain embodiments a combined scanner/shredder may be used in which the documents are shredded immediately after scanning. Such embodiments require the scanner 20 to be highly reliable, however, as scanning failures cannot be corrected by re-scanning the document when it is shredded automatically. Having the inmate acknowledge receipt or accurate scanning prior to shredding provides evidence of proper delivery of the legal postal mail 1. An alternative to shredding the document would be for the inmate or staff member to place the scanned legal postal mail into a secure inmate property bag for secure storage.

Power supply 80 may provide power to those components on legal postal mail processing cart 10 that do not use their own internal batteries, which will typically include printer 40, scanner 20, shredder 70 and Wi/Fi access point 70. It will be understood that finger print 60 or RFID card/wristband reader 61 and a separate camera 900 could receive power from either power supply 80 or directly from portable computer or tablet 30 via a USB or similar cable.

Power supply 80 may be a single, integrated unit such as a MINUTEMAN BP36RTXL (1164)—Extended Battery Pack or similar device or it may comprise separate components depending on the power needs of the devices in use. In either event power supply 80 will comprise a battery 84 and a power transformer or inverter 86 capable of meeting the power requirements (voltage and amperage) of the selected devices.

Shelving 90 may optionally be included as well to provide storage for the legal postal mail 1 to be distributed and/or supplies such as paper and printer ink. For security purposes, it may be convenient to enclose shelving 90 in a locking cabinet.

Through this process, the inmate will either be able to view a secure, scanned image of the legal postal mail 1 on an inmate messaging system or will have a paper copy of the legal postal mail 1. In either event, any contraband in the legal postal mail 1 will have been destroyed or rendered inaccessible by the shredding or property storage process. Where the scanned image copy is stored for display in the inmate messaging system, portable computer or tablet 30 will transmit the scanned image copy with data and commands sufficient for it to be stored in a manner that the inmate messaging system will not allow it to be displayed to corrections facility personnel.

As is referenced above, it will be understood that the legal postal mail processing station may be either mobile as described in connection with the description of legal postal mail processing cart 10 or a fixed kiosk or station using similar components, but in a fixed location and without the need of power supply 80. The legal postal mail processing station may also contain any of the following additional hardware and associated software viewing software 92, printing software 93, portable storage medium docking device 91 such as USB connector or SD card reader and DVD/CD burner and reader 94.

Figure 2:
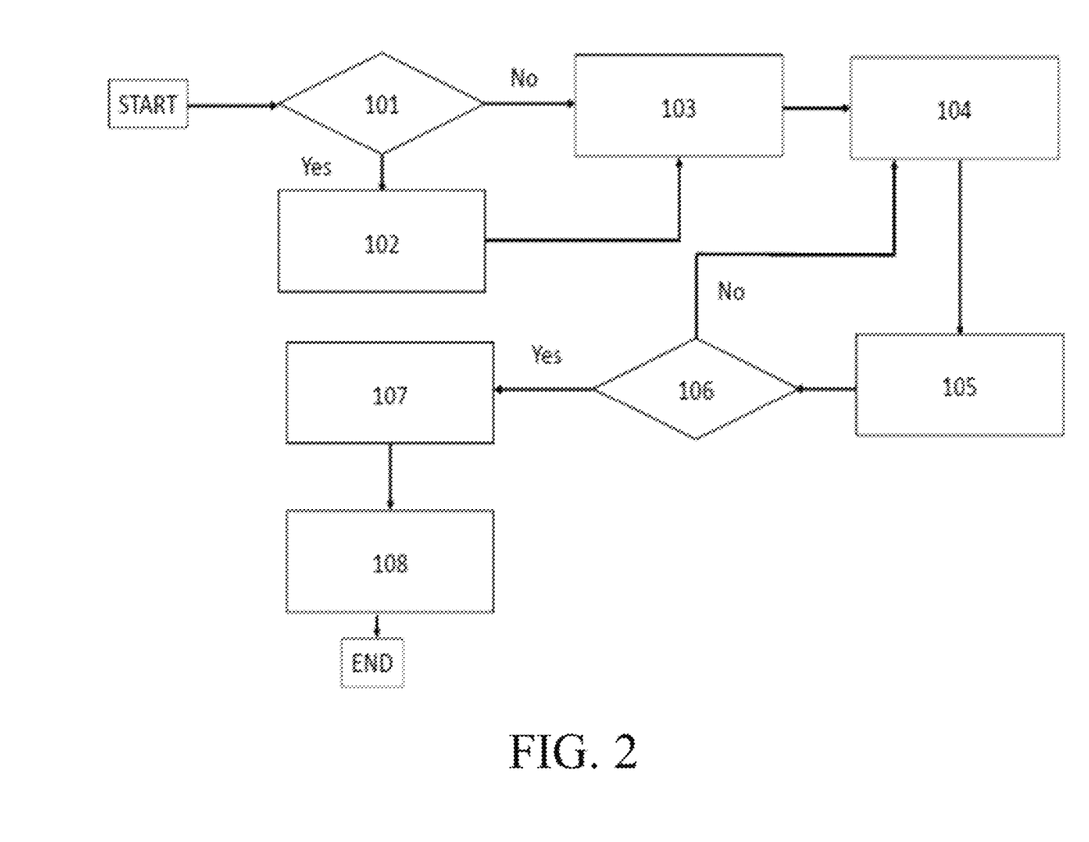
FIG. 2 illustrates a flow chart of the processing of legal postal mail in an embodiment of a legal postal mail processing station utilizing a copier.

FIG. 2 illustrates a method of using the system previously described, in which the inmate retains a paper copy of the legal postal mail 1. In step 101 it is determined if logging is required.

In step 102 (corrections personnel log delivery on paper or electronically) the corrections personnel may log the delivery of the legal postal mail to the inmate on paper or using portable computer or tablet 30 (which need not be portable in the event a fixed kiosk or station is used instead of a portable cart), and/or optional finger print or RFID card/wristband reader 60 as has been previously described.

Next the staff member logs in to the mail scanning station using credentials to identify the staff member.

The staff member searches for the recipient inmate by name or inmate identifier to associate the documents to be scanned with the inmate's account;

In step 103 provide legal postal mail 1 to inmate, the inmate is proximal to the processing cart 10, the legal postal mail is provided to the inmate who opens and copies it in step 104 inmate opens and copies legal postal mail 1. Here it is apparent that if only a paper copy is needed a copier, or a multifunction device may be used in lieu of separate scanner 20 and printer 40. The inmate then verifies the copy in step 105 (copy 1) inmate verifies copy. If the inmate determines in step 106 that the copy is not accurate or complete, a new copy is made in step 104 (copy 2) and the copy 1 can be shredded. The process can be repeated until a readable copy is created in step 104. If the copy 1 or 2 is accurate, the inmate then shreds the legal postal mail step 107 and retains the copy which is now contraband free in step 108 and inmate retains copy.

Figure 3:
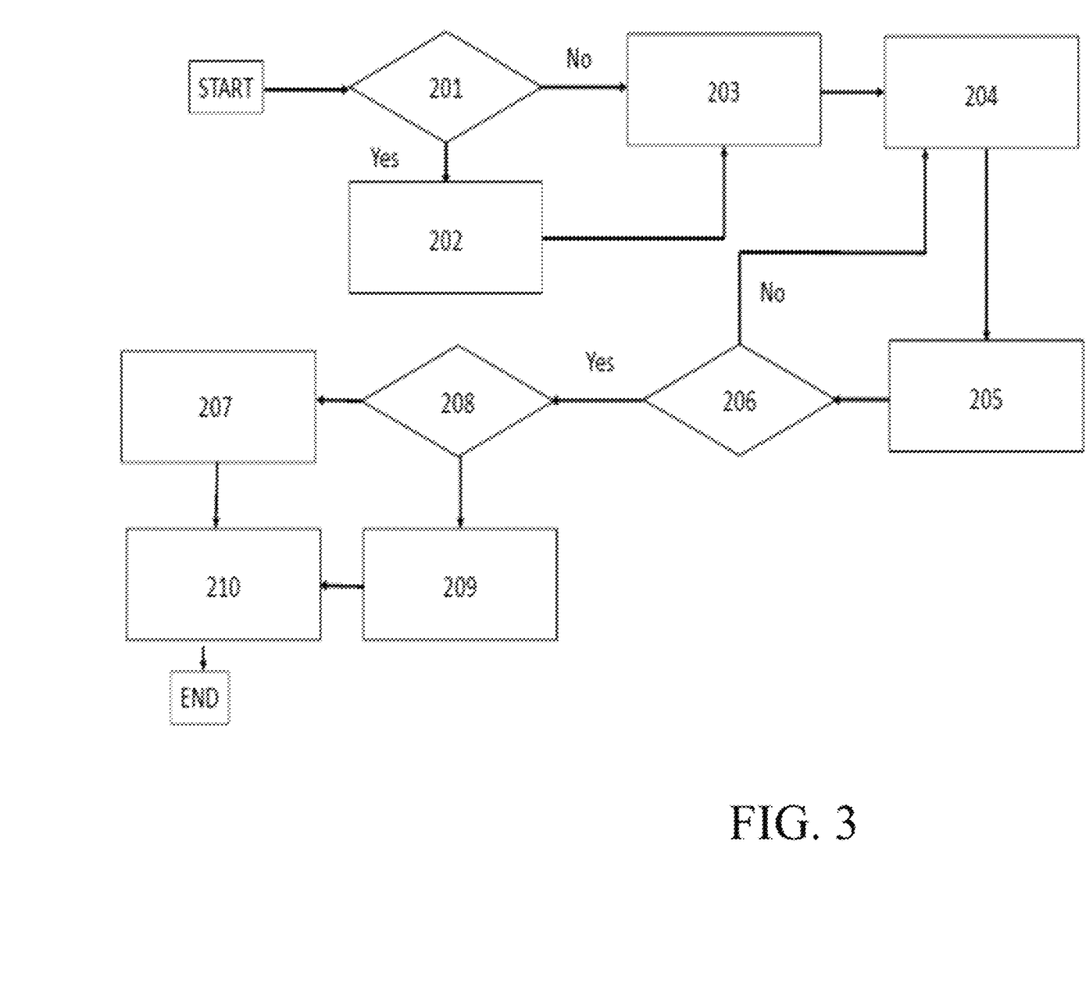
FIG. 3 illustrates a flow chart of the processing of legal postal mail in an embodiment of a legal postal mail processing station utilizing a scanner, an electronic inmate messaging system, and an optional printer.

Likewise, FIG. 3 illustrates a method of using the system previously described in which the legal postal mail 1 is scanned, and the scan is stored on an inmate messaging system. In step 201 (is logging required), it is determined if logging is required. This may be done as a matter of institutional policy or as a matter of choice by correctional personnel on a unit-by-unit, or inmate-by-inmate basis. But it is likely that it will be determined as a matter of institution policy. If so, in step 202 (corrections personnel log delivery on paper or electronically) the corrections personnel may log the delivery of the legal postal mail 1 to the inmate on paper or using portable computer or tablet 30 (which need not be portable in the event a fixed kiosk or station is used instead of a portable cart), and/or optional finger print or RFID card/wristband reader 60 as has been previously described. In step 203 (provide legal postal mail 1 to inmate), the legal postal mail is provided to the inmate who opens and scans it in step 204 (inmate opens and copies legal postal mail 1) using scanner 20 or a multifunction device (not illustrated) as previously described. The inmate then verifies the scanned image copy in step 205 (inmate verifies scanned image copy). If the inmate determines in step 206 (is scanned image copy accurate) that the scanned image copy is not accurate or complete, a new scanned image copy is made in step 204. If allowed by the institution, the inmate may be given an option in step 208 (inmate given option to print scanned image copy) to print a copy of the scanned image copy and retain it. If the inmate elects to do so, the scanned image copy can be printed by printer 40 in step 209 (print copy) and retained. If the scan is accurate or the inmate has printed the scanned image copy, the inmate then shreds the original and step 207. In either event, portable computer or tablet 30 will have transmitted the scanned image copy of the legal postal mail 1 to an inmate messaging system that will allow the inmate to view the scanned image copy at a later time in step 210 (inmate views scanned image through messaging system). More information about the design and operation of an appropriate inmate messaging system is available in U.S. application Ser. No. 15/153,171, previously incorporated by reference.

Figure 4:
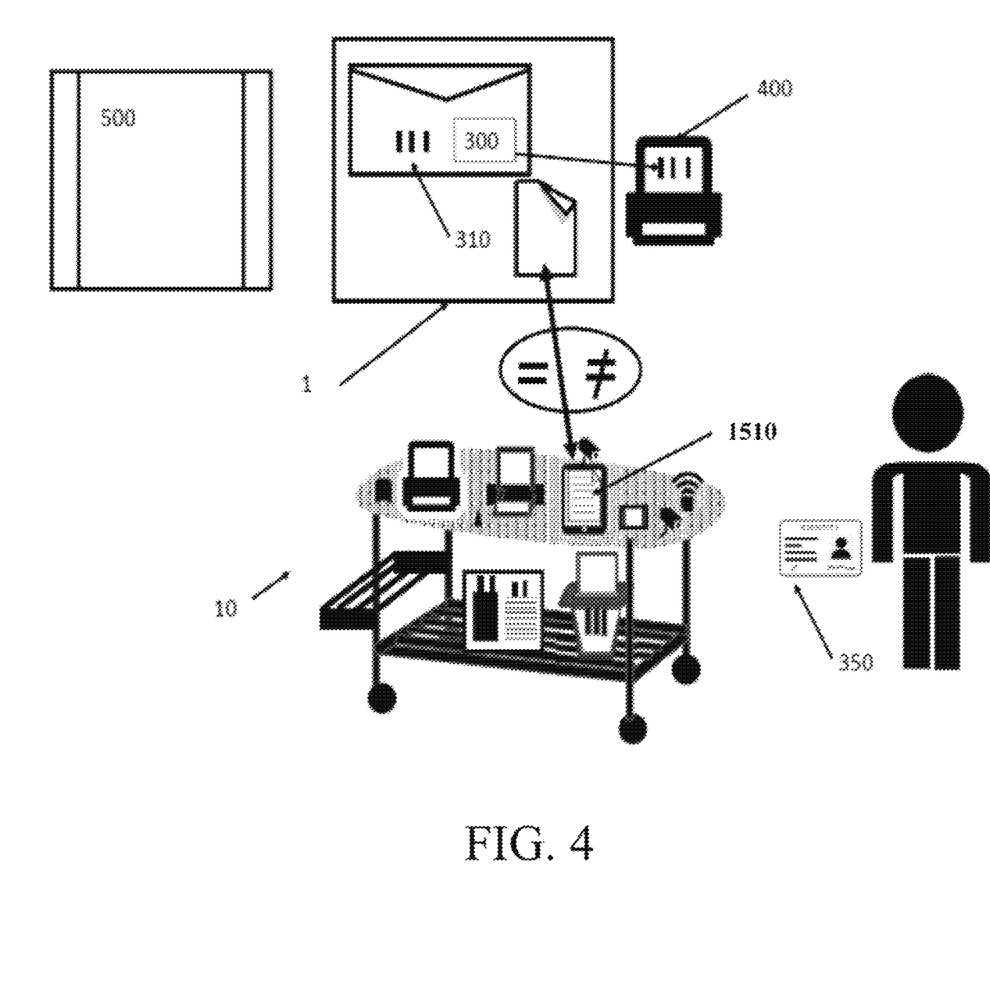
FIG. 4 illustrates embodiment of the invention that utilizes a legal postal mail tracking device.

Referring to FIG. 4 which presents an alternated embodiment that utilizes a legal postal mail tracking device which provides for a unique identifier for each piece of legal postal mail. The identifier is placed on the legal postal mail once it is identified by the staff as legal postal mail. This provides a unique identifier for the legal postal mail and insures that there is proper handling of the mail. The unique identifier could be in any form that allows electronic tracking so that the mail is easily identifiable as legal postal mail. The following is a brief description of the process utilizing the unique identifier to track legal postal mail within the facility and insure that the mail is delivered expeditiously to the correct inmate. The process could utilize the following steps:

1) When legal postal mail 1 has been identified at the mail receiving station 500 as legal postal mail it is assigned a unique identifier id 300 which has a corresponding RFID and/or bar code 310. Alternatively, the institution could also use a Bluetooth® LTE, WI/FI or ZigBee® transmitter as the unique identifier and the address or id for that transmitter would be associated with the particular piece of mail.

2) The unique identifier id 300 is then associated with the legal postal mail 1 and the inmate identifier which is associated with the inmate who the legal postal mail 1 is addressed to by entering it in a legal postal computer tracking system 400 which must be accessible from the legal postal mail processing cart.

3) The legal postal mail 1 and the legal postal mail processing cart 10 will be taken to the inmate or if the legal postal mail processing cart 10 is stationary the inmate will be brought to the legal postal mail processing cart 10.

4) The staff member logging in to the mail scanning station using credentials to identify the staff member.

5) The institution personnel will scan the mail unique identifier 300 and the inmate identifier 350 and enter them into the legal postal mail computer tracking system. The inmate identifier 350 could be facial recognition, RFID identity card, RFID bracelet, Bluetooth® LTE, WI/FI or ZigBee® transmitter.

6) If the legal postal mail unique identifier 300 and inmate identifier 350 do not match the mail will be returned to the mail receiving station 500 for verification. If the unique identifier 300 and the inmate identifier 350 match, then the legal postal mail 1 will be opened by the inmate in front of the institution personnel.

7) The legal postal mail 1 will be scanned in front of the inmate by the institution personnel or by the inmate under the supervision of the institution personnel.

8) The inmate will compare the scanned mail 1510 and the legal postal mail 1.

9) After the inmate concurs with the scan mail 1510 of the legal postal mail 1 the Bluetooth® LTE, WI/FI or ZigBee® transmitter, RFID and/or bar code can be removed by the institution staff if required by the institution protocol, else it can stay with the mail and the mail will be bagged for storage or shredded.

10) The inmate will be provided access to the scanned mail 1510 either through using their inmate identifier and the messaging system of given a printed copy of scan mailed 1510.

Alternatively, the system can be simplified to consist of:
a) a copier;
b) a shredder;
c) a power supply
all mounted on a portable cart of at a fix work station; wherein corrections personnel can provide legal postal mail to the inmate; wherein the inmate can copy the legal postal mail with the copier and then shred the legal postal mail with the shredder and retain only the copy of the legal postal mail.

Figure 5:
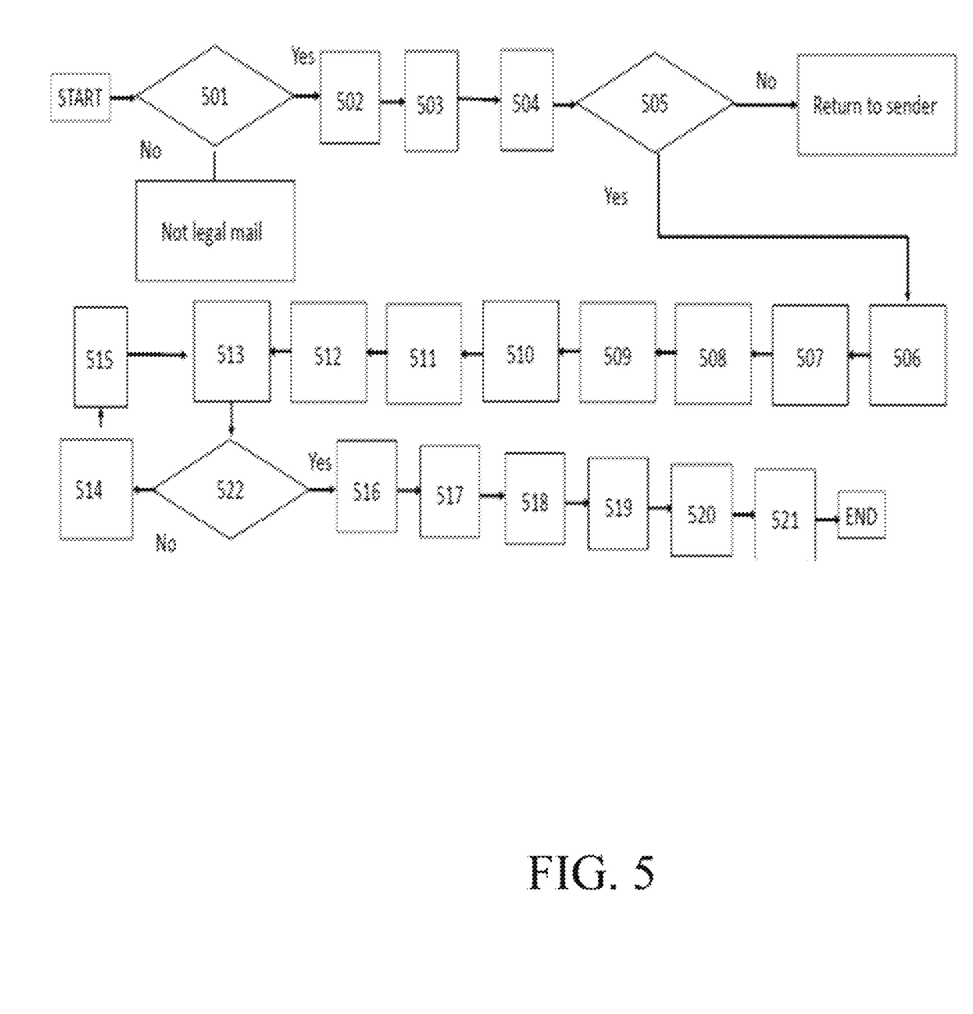
FIG. 5 illustrates a flow chart of the processing of legal postal mail in an embodiment of a legal postal mail processing station utilizing a scanner, an electronic inmate messaging system, and transmitting the scan image to a central database.

Referring to FIG. 5 a flow chart of the processing of legal postal mail in an embodiment of a legal postal mail processing station utilizing a scanner, an electronic inmate messaging system, and transmitting the scan image to a central database for eliminating contraband in legal postal mail for a correctional institution while retaining the privacy of legal mail comprises of the steps:

a. Receiving postal mail at the correctional facility and determining that it qualifies as legal mail Step 501;
b. Identifying mail information of each piece of legal postal mail comprising recipient inmate name and inmate identifier Step 502 and;
c. Identifying legal postal mail sender Step 503;
d. At correctional institution verify that the recipient inmate name and inmate identifier are valid and are active, in-custody, and eligible to receive legal postal mail Step 504;
e. If the inmate is not valid, has been released, transferred, or is otherwise unable to receive legal postal mail as addressed, it may be returned to sender by the facility Step 505;
f. At institution using a legal postal mail scanning station for use by staff member or the inmate under staff member supervision Step 506;
g. Legal mail scanning station comprising of a scanner, a computer with a first camera and display, a shredder, a second camera and a printer; staff member logging in to the mail scanning station using credentials to identify the staff member Step 507.
h. Staff member searching for recipient inmate by name or inmate identifier to associate the documents to be scanned with inmate's account Step 508;
   a) Provide legal postal mail to inmate identified by inmate identifier at inmate institution, inmate being proximal to mail scanning station and said first camera recording a picture of said inmate; Step 509;
i. Inmate or staff member entering the name of the sender from legal mail Step 510;
j. Second camera begins to record a video of the scanning process Step 511;
k. Inmate opening the legal mail associated with the recipient inmate name and the inmate identifier Step 512;
l. Inmate scanning legal mail using a scanner attached to computer on mail delivery station to create a scanned image copy 1 for review and on a computer attached to the scanner Step 513;
m. Inmate verifying that scanned image copy 1 from computer on mail delivery station is readable Step 522;
n. If scanned image copy 1 is not readable Step 522 then inmate deletes scanned image copy 1 Step 514, inmate rescans Step 515 the legal mail using the scanner to create a scanned image copy 1, inmate repeats steps m and n until scan copy 1 is readable;
o. If the scanned image copy 1 is readable then the inmate approves the scan and stores the scanned image copy 1 Step 516 on computer memory attached to the scanner on the mail scanning station as scan image copy;
p. The video recorded by the second camera of steps 511-516 being uploaded to a central server for storage and later retrieval Step 517;
q. The inmate printing scan image copy Step 518;
r. The inmate shredding legal mail Step 519;
s. Transmitting scanned image copy and storing scanned image copy using an electronic transmission method from the computer on legal postal mail scanning station to recipient inmate via institution messaging system, inmate being identified in messaging system by inmate identifier Step 520;
t. wherein the risk of recipient inmate receiving contraband in legal mail is essentially eliminated Step 521.

The second camera and the steps associated with the second camera are optional and some correctional institutions will not use or have a second camera to record videos of the inmate opening and scanning legal postal mail.

The electronic transmission method can be selected from the group consisting of, but not limited to, Bluetooth®, Zigbee®, WI/FI, 3G, 4 G and 5 G wireless mobile telecommunications technology, radio frequency, telephonic modem signals and wired ethernet internet.

The legal mail scanning station is configured such that the computer is adapted to store a log of the delivery and copying of the legal postal mail.

Once the legal postal mail has been scanned and transmitted to the inmate messaging system the inmate can then access the scanned legal mail using the inmate messaging system. In most cases the access to the scanned legal mail will require the inmate to enter a second, additional, or different password, or use biometrics such as an iris scan, fingerprint scan or facial recognition, to enable access to the copy of legal mail delivered through inmate messaging system. The inmate messaging system can be any of the following electronic access systems as an email system, electronic kiosk, tablet computer, computer system or messaging system.

Figure 6:
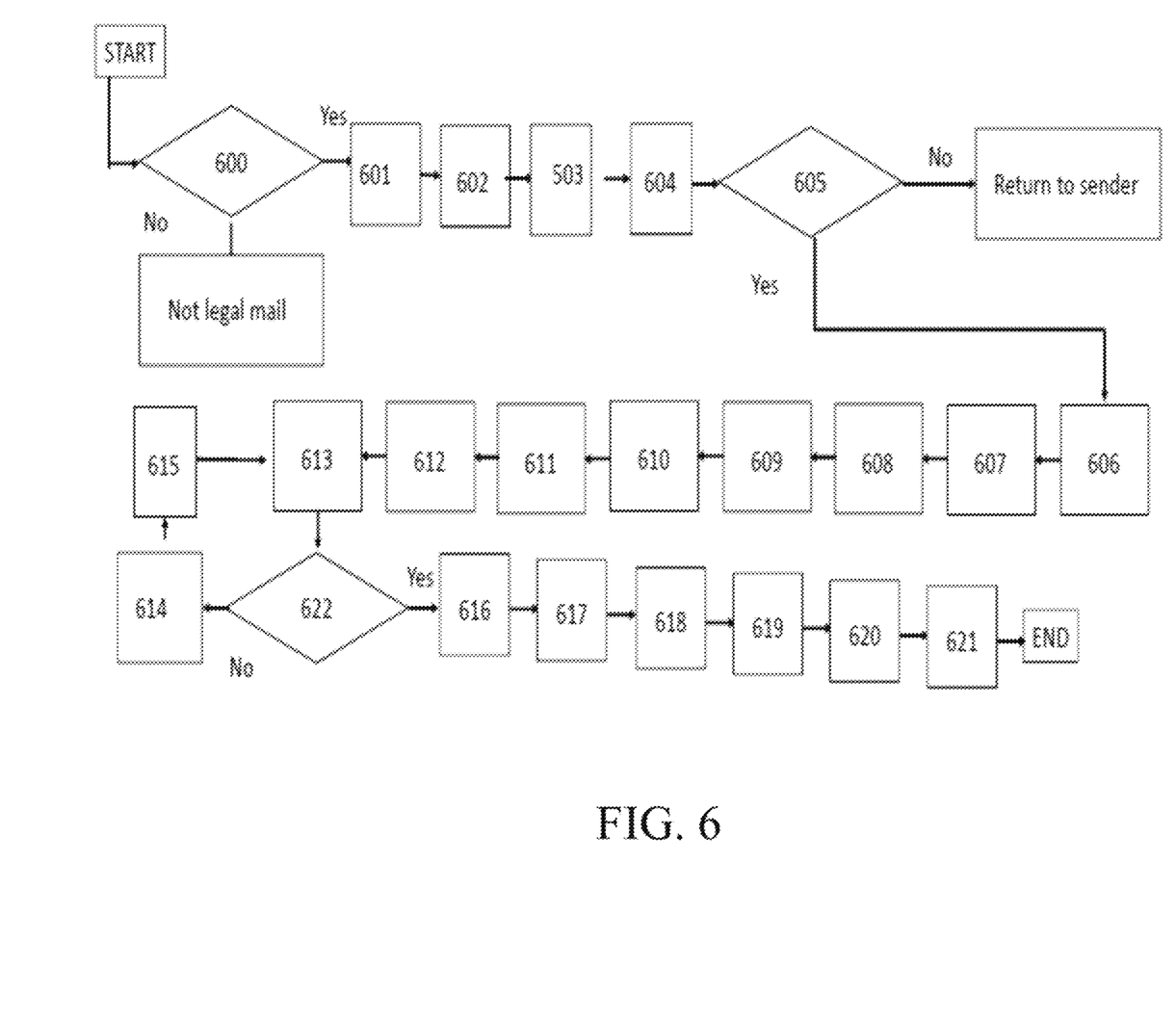
FIG. 6 illustrates a flow chart of the processing of legal postal mail received at a central processing facility in an embodiment of a legal postal mail processing station utilizing a scanner, an electronic inmate messaging system, and transmitting the scan image to a central database.

Referring to FIG. 6 a flow chart of the processing of legal postal mail received at a central processing facility using an embodiment of a legal postal mail processing station utilizing a scanner, an electronic inmate messaging system, and transmitting the scan image to a central database for eliminating contraband in legal postal mail for a correctional institution while retaining the privacy of legal mail comprises of the steps:

a. Receiving postal mail at the processing facility and determining that it qualifies as legal mail Step 600;

b. Separate legal postal mail from non-legal postal mail and place legal postal mail in legal postal mail queue and place non-legal postal mail in non-legal postal mail queue, separating legal postal mail queue by correctional institution, and sending the legal postal mail to each correctional institution Step 601;

c. At the correctional institution Identifying mail information of each piece of legal postal mail comprising recipient inmate name and inmate identifier Step 602 and;

d. Identifying legal postal mail sender Step 603;

e. At correctional institution verify that the recipient inmate name and inmate identifier are valid and are active, in-custody, and eligible to receive legal postal mail Step 604;

f. If the inmate is not valid, has been released, transferred, or is otherwise unable to receive legal postal mail as addressed, it may be returned to sender by the facility Step 605;

g. At institution using a legal postal mail scanning station for use by staff member or the inmate under staff member supervision Step 606;

h. Legal mail scanning station comprising of a scanner, a computer with a first camera and display, a shredder, a second camera and a printer; staff member logging in to the mail scanning station using credentials to identify the staff member Step 607.

i. Staff member searching for recipient inmate by name or inmate identifier to associate the documents to be scanned with inmate's account Step 608;

j. Provide legal postal mail to inmate identified by inmate identifier at inmate institution, inmate being proximal to mail scanning station and said first camera recording a picture of said inmate; Step 609;

k. Inmate or staff member entering the name of the sender from legal mail Step 610;

l. Second camera begins to record a video of the scanning process Step 611;

m. Inmate opening the legal mail associated with the recipient inmate name and the inmate identifier Step 612;

n. Inmate scanning legal mail using a scanner attached to computer on mail delivery station to create a scanned image copy 1 for review and on a computer attached to the scanner Step 613;

o. Inmate verifying that scanned image copy 1 from computer on mail delivery station is readable Step 622;

p. If scanned image copy 1 is not readable Step 622 then inmate deletes scanned image copy 1 Step 614, inmate rescans Step 615 the legal mail using the scanner to create a scanned image copy 1, inmate repeats steps o and p until scan copy 1 is readable;

q. If the scanned image copy 1 is readable then the inmate approves the scan and stores the scanned image copy 1 Step 616 on computer memory attached to the scanner on the mail scanning station as scan image copy;

r. The video recorded by the second camera of steps 611-616 being uploaded to a central server for storage and later retrieval Step 617;

s. The inmate printing scan image copy Step 618;

t. The inmate shredding legal mail Step 619;

u. Transmitting scanned image copy and storing scanned image copy using an electronic transmission method from the computer on legal postal mail scanning station to recipient inmate via institution messaging system, inmate being identified in messaging system by inmate identifier Step 620;

v. wherein the risk of recipient inmate receiving contraband in legal mail is essentially eliminated Step 621.

The second camera and the steps associated with the second camera are optional and some correctional institutions will not use or have a second camera to record videos of the inmate opening and scanning legal postal mail.

The electronic transmission method can be selected from the group consisting of, but not limited to, Bluetooth®, Zigbee®, WI/FI, 3G, 4 G and 5 G wireless mobile telecommunications technology, radio frequency, telephonic modem signals and wired ethernet internet.

The legal mail scanning station is configured such that the computer is adapted to store a log of the delivery and copying of the legal postal mail.

Once the legal postal mail has been scanned and transmitted to the inmate messaging system the inmate can then access the scanned legal mail using the inmate messaging system. In most cases the access to the scanned legal mail will require the inmate to enter a second, additional, or different password, or use biometrics such as an iris scan, fingerprint scan or facial recognition, to enable access to the copy of legal mail delivered through inmate messaging system. The inmate messaging system can be any of the following electronic access systems as an email system, electronic kiosk, tablet computer, computer system or messaging system.

While the invention has been particularly shown and described with reference to certain embodiments thereof, it will be understood by those skilled in the art that various changes in form and details may be made therein without departing from the spirit and scope of the invention.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

I claim:

1. A method for eliminating contraband in legal postal mail for a correctional institution while retaining the privacy of legal mail comprising of:
   a) receiving postal mail at the correctional institution and determining that it qualifies as legal mail;
   b) identifying mail information of each piece of legal postal mail comprising recipient inmate name and inmate identifier and;
   c) identifying legal postal mail sender;
   d) at said institution verify that said recipient inmate name and said inmate identifier are valid and are active, in-custody, and eligible to receive legal postal mail;
   e) if the inmate is not valid, has been released, transferred, or is otherwise unable to receive legal postal mail as addressed, it may be returned to sender by the facility;
   f) at said institution using a legal postal mail scanning station for use by said correctional institution staff member or said inmate under said correctional institution staff member supervision;
   g) said legal mail scanning station comprising of a scanner, a computer with a first camera and display, a shredder, a second camera and a printer;
   h) said correctional institution staff member logging in to the legal mail scanning station and said logging comprises of using credentials to identify said staff member;
   i) said correctional institution staff member searching for said recipient inmate by name or inmate identifier to associate the documents to be scanned with said inmate's account;
   j) provide said legal postal mail to said inmate identified by inmate identifier at said inmate institution said inmate being proximal to said mail scanning station and said inmate logging into the legal mail scanning station;
   k) said inmate or said correctional institution staff member entering the name of the sender from said legal mail;
   l) said second camera beginning to record a video of the scanning process;
   m) said inmate opening said legal mail associated with said recipient inmate name and said inmate identifier;
   n) said inmate scanning said legal postal mail using a scanner attached to said computer on mail delivery station to create a scanned image copy 1 for review and on a computer attached to said scanner;
   o) said inmate verifying that said scanned image copy 1 from said computer on said mail delivery station is readable;
   p) if scanned image copy 1 is not readable then said inmate deletes scanned image copy 1, said inmate rescans said legal postal mail using said scanner to create a scanned image copy 1, inmate repeats steps o and p until scan copy 1 is readable;
   q) if the scanned image copy 1 is readable then said inmate approves the scan and stores said scanned image copy 1 on said computer memory attached to said scanner on said mail scanning station as scan image copy;
   r) said video recorded of steps l-q being uploaded to a central server for storage and later retrieval;
   s) said inmate printing said scan image copy;
   t) said inmate shredding said legal postal mail;
   u) transmitting said scanned image copy and storing said scanned image copy using an electronic transmission method from said computer to said recipient inmate via said institution messaging system said inmate being identified in said messaging system by inmate identifier;
   v) wherein the risk of said recipient inmate receiving contraband in legal postal mail is essentially eliminated.

2. The legal mail scanning station of claim 1 wherein said electronic transmission method is a wireless network.

3. The legal mail scanning station of claim 1 wherein said computer is adapted to allow said correctional institution staff member to log the delivery of the legal postal mail using said computer.

4. The legal mail scanning station of claim 1 further comprising a fingerprint reader in operative connection with said computer wherein said logging comprises the inmate scanning their finger print after receiving the legal postal mail.

5. The legal mail scanning station of claim 1 further comprising a camera in operative connection with said computer wherein said logging comprises facial recognition of the inmate by said computer.

6. The legal mail scanning station of claim 1 wherein said computer is a tablet computer adapted to communicate wirelessly with said printer and said scanner.

7. The method of claim 1 further comprising providing the legal postal mail to:
   a) the inmate;

b) the inmate opening and copying the legal postal mail; and
c) the inmate shredding the original legal postal mail and retaining the copy;
d) wherein the risk of said recipient inmate receiving contraband in legal postal mail is essentially eliminated.

8. The method of claim 1 further comprising providing the legal postal mail to the inmate;
   a) the inmate opening and scanning the legal postal mail; the inmate shredding the original legal postal mail;
   b) the inmate viewing the scan of the legal postal mail in an inmate messaging system;
   c) wherein the risk of said recipient inmate receiving contraband in legal postal mail is essentially eliminated.

9. A legal mail scanning station of claim 1 comprising a table supported by wheels to form a portable cart and said table having shelving and a table top, such that:
   a) a shredder;
   b) a scanner;
   c) a tablet or other computer;
   d) viewing software;
   e) printing software;
   f) portable storage medium docking device;
   g) a CD burner and reader; and
   h) a printer;
   i) a power supply;
   are mounted on said portable cart;
wherein correctional institution staff member can provide legal postal mail to the inmate; wherein the inmate can scan said legal postal mail with said scanner and shred said legal postal mail with said shredder or place said legal postal mail into a secure property bag and save the scanned image of the legal postal mail.

10. The legal mail scanning station of claim 9 wherein said portable storage medium docking device is selected from the group consisting of USB connector and SD card reader.

11. The legal mail scanning station of claim 1 wherein said computer is adapted to store a log of the delivery and copying of said legal postal mail.

12. The method of claim 1 wherein said inmate access to the messaging system is by inmate identifier and said inmate must enter a second, additional, or different password, or use biometrics such as a fingerprint scan or facial recognition, to enable access to said copy of legal mail delivered through an inmate device such as a kiosk, tablet, or messaging system.

13. The legal mail scanning station of claim 1 whereas the logging into the legal mail scanning station consists entering a password and then optionally uses a second form of identification selected from the group consisting of an iris scan, fingerprint scan and facial recognition.

14. The legal mail scanning station of claim 1 whereas the logging into the legal mail scanning station consists entering a password and then using said first camera and recording a picture of said inmate.

15. A method for eliminating contraband in legal postal mail at a mail processing facility while retaining the privacy of said legal postal mail comprising of:
   a) receiving postal mail at a processing facility and determining that it qualifies as legal mail;
   b) separate legal postal mail from non-legal postal mail and place said legal postal mail in legal postal mail queue and place non-legal postal mail in non-legal postal mail queue;
   c) separating said legal postal mail queue by correctional institution, and sending said legal postal mail to each correctional institution;
   d) at said correctional institution identifying mail information of each piece of legal postal mail comprising recipient inmate name and inmate identifier and;
   e) identifying legal postal mail sender;
   f) at said processing facility verify that said recipient inmate name and said inmate identifier are valid and are active, in-custody, and eligible to receive legal postal mail;
   g) If the inmate is not valid, has been released, transferred, or is otherwise unable to receive legal postal mail as addressed, it may be returned to sender by the facility;
   h) at said institution using a legal postal mail scanning station for use by said correctional institution staff member or said inmate under said correctional institution staff member supervision;
   i) said legal mail scanning station comprising of a scanner, a computer with a first camera and display, a shredder, a second camera and a printer;
   j) said correctional institution staff member logging in to the legal mail scanning station using credentials to identify said staff member;
   k) said correctional institution staff member searching for said recipient inmate by name or inmate identifier to associate the documents to be scanned with said inmate's account;
   w) provide said legal postal mail to said inmate identified by inmate identifier at said inmate institution said inmate being proximal to said mail scanning station and said inmate logging into the legal mail scanning station;
   l) said inmate or said correctional institution staff member entering the name of the sender from said legal mail;
   m) said second camera beginning to record a video of the scanning process;
   n) said inmate opening said legal mail associated with said recipient inmate name and said inmate identifier;
   o) said inmate scanning said legal postal mail using a scanner attached to said computer on mail delivery station to create a scanned image copy 1 for review and on a computer attached to said scanner;
   p) said inmate verifying that said scanned image copy 1 from said computer on said mail delivery station is readable;
   q) if scanned image copy 1 is not readable then said inmate deletes scanned image copy 1, said inmate rescans said legal postal mail using said scanner to create a scanned image copy 1, inmate repeats steps p and q until scan copy 1 is readable;
   r) if the scanned image copy 1 is readable then said inmate approves the scan and stores said scanned image copy 1 on said computer memory attached to said scanner on said mail scanning station as scan image copy;
   s) said video recorded of steps n-s being uploaded to a central server for storage and later retrieval;
   t) said inmate printing said scan image copy;
   u) said inmate shredding said legal postal mail;
   v) transmitting said scanned image copy and storing said scanned image copy using an electronic transmission method from said computer to said recipient inmate via said institution messaging system said inmate being identified in said messaging system by inmate identifier;
   w) wherein the risk of said recipient inmate receiving contraband in legal postal mail is essentially eliminated.

16. The legal mail scanning station of claim 15 wherein said computer is adapted to transmit the scan to an inmate messaging system via a wireless network.

17. The legal mail scanning station of claim 15 wherein said computer is adapted to allow said correctional institution staff member to log the delivery of the legal postal mail using said computer.

18. The legal mail scanning station of claim 15 further comprising a fingerprint reader in operative connection with said computer wherein said logging comprises the inmate scanning their finger print after receiving the legal postal mail.

19. The legal mail scanning station of claim 15 further comprising a camera in operative connection with said computer wherein said logging comprises facial recognition of the inmate by said computer.

20. The legal mail scanning station of claim 15 wherein said computer is a tablet computer adapted to communicate wirelessly with said printer and said scanner.

21. The method of claim 15 further comprising providing the legal postal mail to:
 a) the inmate;
 b) the inmate opening and copying the legal postal mail; and
 c) the inmate shredding the original legal postal mail and retaining the copy;
 d) wherein the risk of said recipient inmate receiving contraband in legal postal mail is essentially eliminated.

22. The method of claim 15 further comprising providing the legal postal mail to the inmate;
 a) the inmate opening and scanning the legal postal mail; the inmate shredding the original legal postal mail;
 b) the inmate viewing the scan of the legal postal mail in an inmate messaging system;
 c) wherein the risk of said recipient inmate receiving contraband in legal postal mail is essentially eliminated.

23. A legal mail scanning station of claim 15 comprising a table supported by wheels to form a portable cart and said table having shelving and a table top, such that:
 a) a shredder;
 b) a scanner;
 c) a tablet or other computer;
 d) viewing software;
 e) printing software;
 f) portable storage medium docking device;
 g) a CD burner and reader; and
 h) a printer;
 i) a power supply;
 are mounted on said portable cart;
wherein correctional institution staff member can provide legal postal mail to the inmate; wherein the inmate can scan said legal postal mail with said scanner and shred said legal postal mail with said shredder or place said legal postal mail into a secure property bag and save the scanned image of the legal postal mail.

24. The legal mail scanning station of claim 23 wherein said portable storage medium docking device is selected from the group consisting of USB connector and SD card reader.

25. The legal mail scanning station of claim 15 whereas the logging into the legal mail scanning station consists entering a password and then optionally uses a second form of identification selected from the group consisting of an iris scan, fingerprint scan and facial recognition.

26. The legal mail scanning station of claim 15 whereas the logging into the legal mail scanning station consists entering a password and then using said first camera and recording a picture of said inmate.

* * * * *